READOUT FOR SPACE CODED DATA

Filed April 23, 1964 3 Sheets-Sheet 1

Inventor
Konrad Zuse
Silverman + Cass
ATTYS.

Oct. 29, 1968

K. ZUSE 3,408,483

READOUT FOR SPACE CODED DATA

Filed April 23, 1964

3 Sheets-Sheet 2

Inventor
Konrad Zuse

Silverman + Cass

ATTYS.

Inventor
Konrad Zuse
BY
S. Zollmann Coss
ATTYS.

United States Patent Office 3,408,483
Patented Oct. 29, 1968

3,408,483
READOUT FOR SPACE CODED DATA
Konrad Zuse, Hunfeld im Haselgrund, Hesse, Germany, assignor to Zuse KG, Bad Hersfeld, Germany, a firm
Filed Apr. 23, 1964, Ser. No. 362,093
Claims priority, application Germany, May 2, 1963, Z 10,096
15 Claims. (Cl. 235—61.11)

ABSTRACT OF THE DISCLOSURE

A translating apparatus for a space coded data reader for reading out in proper sequence data on a card without regard to the physical orientation of the card. The translating apparatus evaluates and stores the space coded data in proper sequence by means of control data on the cards. The translating apparatus is composed of electronic gates, a buffer storage device, and translating circuitry. The first column or line of data at either end of the card is coded to provide signals which, upon the reading thereof, establish the orientation of the cards with respect to two axes of symmetry. Translating circuitry transmits the data stored on the record card into the buffer storage device so that the data stored therein is an accurate representation of the data on the card, as if the card were inserted into the reader in correct physical orientation. The buffer storage comprises a plurality of simultaneously operated shift registers which are shiftable in two directions and which are commonly known in the art as bi-directional shift registers. The data stored in the bi-directional shift registers is read out, in proper orientation, upon application of a pulse to the shift registers.

This invention relates to readout systems for data processing apparatus and, more particularly, to a readout arrangement for presenting space coded information in definitively correct signal form without regard to the space orientation of the record carrier containing the space code.

There have been known heretofore many machine arrangements for interpreting stored digital information, stored for example on a conveniently handled record medium such as a punched card. With advantage, such arrangements of the prior art have been most effective in translating the so stored information to a form conveniently adapted for further employment in other data processing apparatus. Commonly, this translating apparatus has come to be known as a reader or a readout apparatus.

A typical convenient record medium has been the punched card having plural space coded binary holes punched therein to denote, in binary form, the information stored thereon. In other arrangements of the type comprehended by the readout apparatus of the invention the recorded information has been stored in the form of discrete space coded magnetic impressions on the record medium, or in the form of discrete optically distinctive impressions or ink markings, also space coded.

Elaborate and oftentimes sophisticated arrangements have been provided for extracting the so stored information and presenting this information in the form of signals, usually electrical signals, which may be conveniently and rapidly introduced as data signals for further processing by the many data processing machines which today have become so important to our society.

The main reason for this importance of data processing machines is based upon the capability of such stored information being rapidly processed by rapidly operating machinery without need for guidance by a human operator. Thus, if there exist ambiguities in the stored information introduced to the data processing apparatus, the need for the relatively slower human skills is required to introduce the incoming information to the reader or translating apparatus, on the one hand, or to compare the so translated information to a reference standard to remove any ambiguities.

The art of data processing has exhibited a marked preference for storing information on rectangular cards having space coded punch holes therethrough. Clearly, such cards, if presented in a reversed end for end longitudinal orientation to translating arrangements renders the space coded information read from such cards incorrect insofar as the processing apparatus is concerned. With equal clarity, the information on such punched cards will be incorrect if the reverse side of the card is presented to the translating apparatus. And, as a third obvious misorientation of the record medium presented to translation apparatus, the reverse side of this record medium may be presented in an orientation that is longitudinally reversed, end for end.

Thus, in a representative situation which may be considered for ease in understanding the invention, a typical record medium may comprise a rectangular card having a plurality of longitudinally extending rows of discrete information containing areas arranged transversely of the card.

Representatively, each of five transversely arranged, longitudinally extending rows of five discrete areas may include five defined areas of informational significance arranged respectively in columns. Thus, as the plural informational areas are punched or not punched in accordance with a preassigned code, the card contains five longitudinally arranged words each of five transversely arranged binary bits. In translating apparatus known heretofore the informational significance of the transversely arranged rows is destroyed if the card record medium be turned over about a longitudinal axis, about a transverse axis, or about both axes before presentation to such translation apparatus.

Briefly, in accordance with one embodiment of the invention, the first line or column of data at either end of a record carrying medium is coded to provide signals, upon reading thereof, which establish the orientation of the record carrying medium with respect to its two axes of symmetry, thereby operating circuitry which enters the data stored upon the record carrying medium into a buffer storage so that said data stored in said buffer storage is an accurate representation of unambiguous character of the coded word read out from the record carrying medium. The buffer storage can comprise a plurality of simultaneously operated shift registers which are shiftable in two directions and commonly known in the art as bidirectional shift registers.

Accordingly it is a primary object of the invention to provide apparatus for translating information stored on a binary space coded record medium to a signal form accurately representing the space code contained thereon.

It is a further object of the present invention to provide record medium translating apparatus which obviates the need for skilled human attendance.

It is still a further object of the invention to provide apparatus for translating space coded signals correctly without regard for reversals of the space code record medium about either or both orthogonal axes thereof.

It is a still further object of the invention to provide space coded record translation apparatus having arrangements for preventing generation of erroneous signals.

The invention will be more clear and further objects thereof will become apparent from a consideration of the following brief description of illustrative embodiments of the invention and from a consideration of the appended claims.

In the drawings:

FIGS. 1*a*, 1*b*, 1*c*, and 1*d* constitute a plan view of a rectangular record medium in four different orientations and having space coded information thereon in the form of discrete punched cards for translation by apparatus in accordance with the invention;

The invention comprises generally an arrangement for providing output signals on a plurality of output leads which correspond in number to the number of binary digits in a single word of the code for which a particular computer, to be employed with apparatus in accordance with the invention is designed. The present invention is utilized to its fullest extent in the reading of a card or other record carrying media provided with punched holes therethrough to indicate a coded representation of data though other types of coded cards can be used. In such a device, there are four possible orientations of the medium, only one of which will provide a correct reading of the data contained thereon in the absence of the present invention.

Figures 1A, 1B, 1C, 1D:
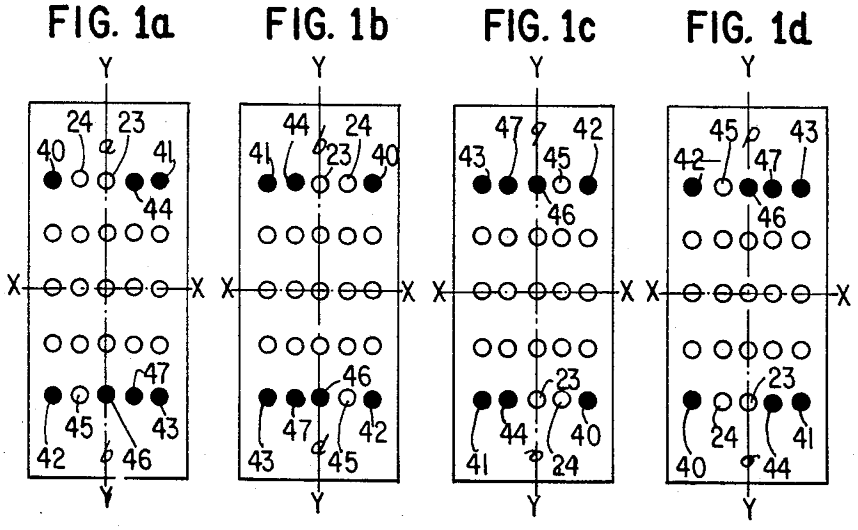

The four possible orientations of a punched record carrying medium are set forth in FIGS. 1*a* to 1*d*. These record carrying media display a binary type code of five units per digit positioned transversely thereacross. FIG. 1*a* sets forth a record carrying card properly oriented for insertion into a card reading machine. The first column in FIG. 1*a* contains the code positions 40, 24, 23, 44 and 41. In FIG. 1*b*, the first column contains the code positions 41, 44, 23, 24 and 40. In FIG. 1*c*, the first column contains the code positions 43, 47, 46, 45 and 42. In FIG. 1*d*, the first column code positions contains the code positions 42, 45, 46, 47 and 43. In the last column of the cards as illustrated in FIGS. 1*a* through 1*d*, respectively, are 42, 45, 46, 47, 43; 43, 47, 46, 45, 42; 41, 44, 23, 24, 40; and 40, 24, 23, 44, 41. A filled circle in the first and last columns means a "hole," a circle not filled means "no hole." The first and last columns of the card contain control data which is utilized by the inventive circuitry disclosed hereinafter to determine the orientation of the card, thereby enabling the space coded data of the second, third and fourth columns to be read and evaluated properly with reference to the control data. The code positions of the second, third and fourth columns are marked by circles only for the sake of clarity.

Referring now to FIG. 1*b*, it is clear that this figure is identical to that of FIG. 1*a* except that this card has been rotated 180° about the first axis Y—Y (see FIG. 1*a*). FIG. 1*c* is an indication of a card identical to that of FIG. 1*a* except that this card has been rotated 180° about the first axis Y—Y and 180° about the second axis X—X (see FIG. 1*a*). FIG. 1*d* is an indication of a card identical to that of FIG. 1*a* except that this card has been rotated 180° about the second axis X—X (see FIG. 1*a*).

FIGURES 1*a* to 1*d* represent the four possible orientations of a punched record carrying medium, each of which can be read unambiguously by the code reader in accordance with the present invention.

Figure 2:
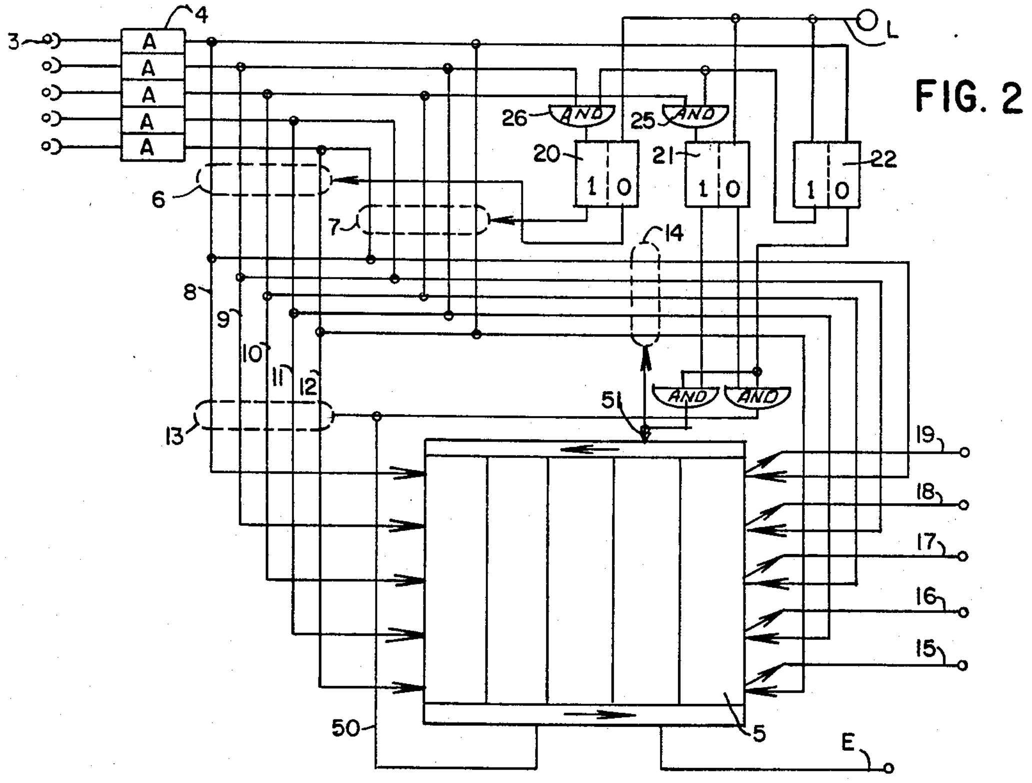
FIGS. 2 and 5 are block diagrams of two embodiments of translating arrangements in accordance with the invention.

FIGURE 2 sets forth a circuit for reading the information stored on the record cards of FIGS. 1*a* to 1*d* in an unambiguous manner regardless of the orientation of the card. The circuit includes a plurality of outputs 3 of a card reader for reading cards of the type shown in FIGS. 1*a* to 1*d*. For normal reading, that is with the card properly oriented as in FIG. 1*a* the digit position 24 would be read out by the next to the topmost output 3, the remaining outputs 3 reading out the other digit positions with which they are spatially associated. The signals impressed on the outputs 3 are amplified by a quintuple amplifier 4 which can comprise five individual amplifiers, one such amplifier coupled to a different one of the outputs 3.

Figure 7:
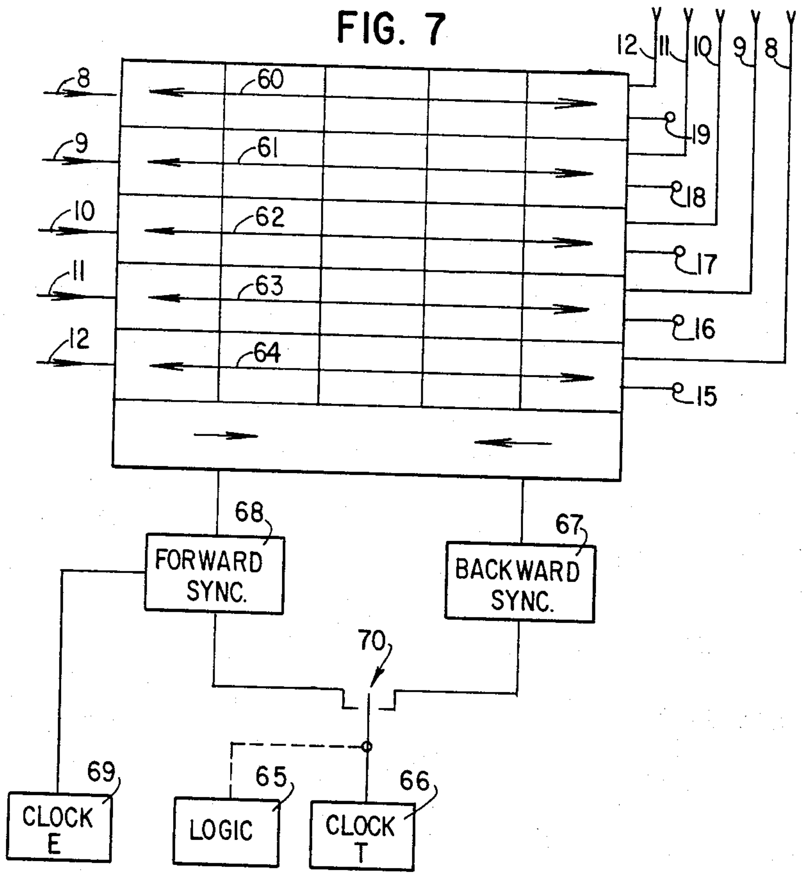
FIG. 7 is a typical buffer storage circuit which could be used in FIG. 2.

After amplification, the output signals of the quintuple amplifier 4 are fed along five parallel channels 8, 9, 10, 11 and 12 to a buffer storage unit 5 where these signals are stored. The buffer storage 5, for example, could comprise (FIG. 7) a plurality of bidirectional shift registers 60 to 64, one such shift register associated with a different one of the channels 8, 9, 10, 11 or 12 and connected at both ends of the associated line. Each of the shift registers would be simultaneously shifted either to the left or to the right by the same shifting or readout signals. Such shifting structure could comprise a logic circuit 65 which would include the AND gates 43 and 44 and adjust the switch 70 to provide T pulses from the T clock circuit 66 to the forward or backward sync pulse generators 68 and 67 for driving the shift registers 60 to 64 simultaneously. Such T clock pulses will be synchronized with the reader (not shown) having outputs 3 so that one row of a card is read for each T pulse. When the contents of the card have entered the shift register, E clock pulses from the E clock pulse generator 69 will cause the shift registers to simultaneously step forward and read the contents thereof out through the outputs 15 to 19. The clock pulse generator 69 can be initiated at any time after the contents of a card have been read into the buffer storage 5, the generator 69 being initiated either automatically or manually. The forward and back sync circuits 67 and 68 could be, for example, clock pulse transfer circuits to initiate shifting of the shift registers. Typical shift registers which could be utilized are shown in the patents of H. N. Crooks, No. 2,911,621; G. L. Clapper, No. 2,842,682; and E. P. G. Wright et al., No. 2,831,150.

There are four possible paths by which signals fed from the amplifiers 4 are stored in the buffer storage 5. A first path would be through the gating circuits 6 and 13 to the left input of the buffer storage 5. A second would be through the gates 6 and 14 to the right input of the buffer storage 5. A third path would be through the gates 7 and 13 to the left input of the buffer storage 5. The fourth path would be through the gates 7 and 14 to the right input of the buffer storage 5. The particular path of travel selected is determined by the orientation of the card as read from the orientation signal information from the first column of the card to be read. The operation of the gates 6, 7, 13 and 14 determines the path of travel of the signals from the amplifier 4, such operation being explained hereinbelow.

Figure 8:
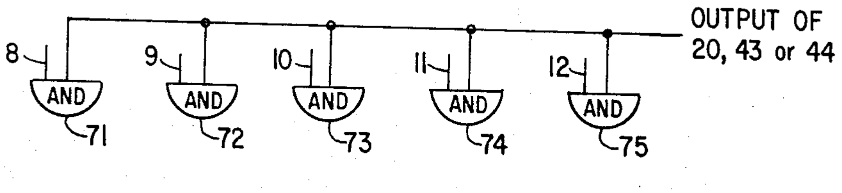
FIG. 8 is a typical gate circuit which could be used as one of gates 6, 7, 13 or 14.

The gate circuits 6, 7, 13 and 14 could each comprise, for example, five individual AND circuits 71 to 75 (FIG. 8) one such AND circuit being placed in each channel and each of the individual AND circuits of a particular gate circuit being opened simultaneously by a proper signal from the bistable device 20 or the AND gates 43 and 44 as explained in detail hereinbelow. AND circuits as described above are well known in the art.

The signal path is selected so that after the reading-in of the data of a record carrier, this data are stored in a form useful for letter used evaluating device (not shown), independently of the position of the record carrier relative to the reading organs having outputs 3. For this purpose the outputs of the quintuple amplifier 4 are simultaneously connected with two gate circuits 6 and 7, one of said gate circuits being open. The outputs of the gate circuits 6 or 7 are again combined on five lines 8, 9, 10, 11, and 12 in such manner that a mirror reversal of the binary information of one line about the central binary information would take place by opening one of the gates 6, 7, rather than the second. The signals on the lines 8 to 12 are simultaneously passed to two additional gate circuits 13 and 14, either or both of which may be closed. If gate 13 is opened, then the shift registers in the buffer storage 5 are simultaneously fed information from left (FIG. 2) to right, and lines 8 to 12 are connected through the open gate 13 with the five left shift register inputs of the buffer storage 5.

If gate 14 is open, then the shift registers in the buffer storage 5 are simultaneously fed information in the opposite direction (from right to left in FIG. 2), and lines 8 to 12 are connected with the five right shift register inputs of the buffer storage 5.

The read out of the shift registers into the output device (not shown) occurs by applying a control pulse along the line E to shift the shift registers to the right and provide an output via five output lines 15, 16, 17, 18 and 19.

As explained supra, the buffer storage 5 comprises, for example, 25 bistable elements, arranged in parallel chains of five bistable elements each and are connected to form five shift registers shiftable in both directions. The connections between the individual elements of the shift registers are passed through gate circuits, which are opened by the above-mentioned preparing lines. The 25 bistable elements are synchronized by a master clock not shown, so that a shifting step is executed in the shift registers only when the circuit is prepared in one direction and when a clock pulse comes.

By suitable control of the quintuple gate circuits 6, 7, 13 and 14, therefore, any mirror reversal about one or both axes X—X and Y—Y is effected. This control is effected by three bistable control elements 20, 21 and 22 with evaluation of the first read column of each record carrier. This line contains the position criterion and must therefore be largely kept free from other information. If all four scanning positions are possible, then at least three binary markings are necessary to determine the card orientation. The coding is advantageously selected so that it can be decoded easily by the bistable control elements 20 to 22.

The central binary element of the first column 40, marked 23 in FIG. 1*a*, indicates whether a rotation of the matrix about the axis X—X has taken place, while the binary element 24 to the left thereof indicates whether a rotation about the first axis Y—Y has taken place. A sensed "hole" in either of these positions therefore defines a rotation and provides a significant signal indicative of same to AND gate 26 and/or AND gate 25.

Accordingly, the central line coming from the quintuple amplifier 4 is connected through an AND gate 25 with the setting input of a bistable control element 21, which can be a flip flop, while the adjacent line is connected through an AND gate 26 with the setting input of a bistable control element 20, which can also be a flip flop.

The bistable control element 22 provides that only the first column read of the card (FIG. 1) be analyzed since this element is not set to the "1" state until the next pulse on the line L arrives. During the subsequent scanning of this card the state of the control elements 20 and 21 is maintained since only a pulse on the line L can reset these elements. The "1" state output of the control element 22 is therefore connected with the second input of the AND gates 25 and 26. This output is energized as long as the first column of a card to be read is being scanned. If holes are placed in the corners of the record carrier, then the first read hole of a row from the quintuple amplifier 4 corresponding to the marginal column can be used as shown to reset the control element 22 (to the "0" state), thereby after this first read column is read, the gates 25 and 26 are disenabled, and a change of the state of the control elements (gates 25 and 26) is possible only with the aid of a control line L signal coming from the outside which resets the control elements 20 and 21 only after the entire card has been read, and which signal sets the control element 22 to the "1" state, whereby the AND gates 25 and 26 are enabled.

If the record carrier has been placed before the reading unit in its normal position as shown in FIG. 1*a*, then none of the two control elements 20 and 21 has been set to the "1" state by the first column since the inputs to the AND gates 25 and 26 from the amplifiers 4 sense "no hole." Accordingly, the gate circuits 6 and 13 are open and the data of the second column of the record carrier is taken over into the buffer storage 5. The AND gates 25 and 26 are disenabled when a "hole" is sensed in a corner of the first column read which resets control element 22 to the "0" state, the further content of the record carrier running unhindered on the same path into the shift registers of the buffer storage 5. The control elements 20 and 21 are immediately brought to the resting state "0," and control element 22 is brought to the set state "1" by a pulse on line L, and the read out of the data content of the buffer storage can take place by feeding pulses along the control line E and shifting the shift registers of the buffer storage 5 to the right to read out the data stored therein along the data lines 15 to 19.

If there is a rotation of the record carrier about the vertical first axis Y—Y as per FIG. 1*b*, then the bistable element 20 is set to the "1" state by the first row signal, gate 7 and gate 13 are opened, and the desired minor reversal takes place during the transmission of the data from the quintuple amplifier 4 to the buffer storage 5. Similarly a position as per FIG. 1*c* brings causes the gate circuits 7 and 14 to be opened, and a position as per FIG. 1*d*, causes the gates 6 and 14 to be opened.

More specifically, in the event the card is rotated 180° about the second axis X—X as in FIGS. 1*c* and 1*d*, the center bit of the first column read will initially provide a signal on the center channel of the output 3 indicative of a "hole" and provide a signal at the already enabled AND gate 25. This signal passes through AND gate 25 and sets the bistable device 21 to the "1" state, thereby passing a signal through the already enabled AND gate 44 to open the gate circuit 14 and cause the shift registers of the buffer storage 5 to be shifted from right to left while storing incoming signals thereto. Such shifting pulses are labelled T in FIG. 3 and are not shown in FIG. 2. However, these T pulses would be the sync pulses in FIG. 3 of the above mentioned Clapper patent, the energization of the AND gate 43 or 44 determining further whether such T pulses are also forward or reverse pulses for shifting each of the shift registers. Alternatively, opening of the gate 43 by non-rotation of the card about the second axis X—X will provide a signal on the line 50 and provide forward shifting pulses to the shift registers.

Figure 3:
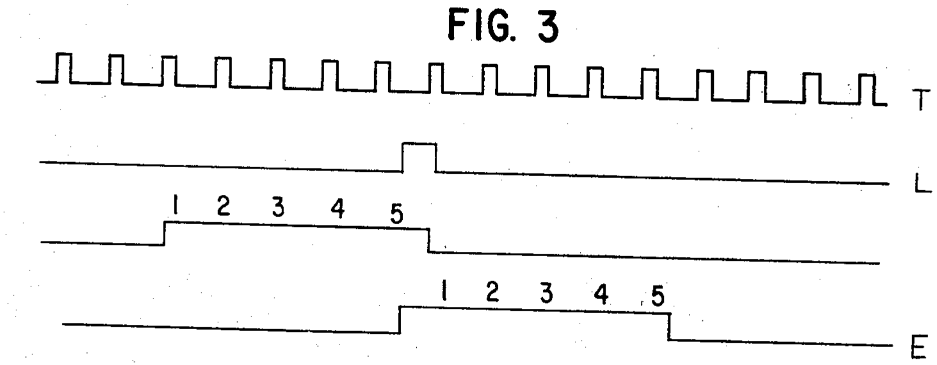
FIG. 3 is an illustration of waveforms of assistance in explaining the operation of translating arrangements in accordance with the illustration of FIG. 2.

FIG. 3 once more specifically explains the function of the above-mentioned circuit arrangement by means of some pulse diagrams. The top line T of this figure is the time scale. To obtain a definite switch sequence, it is necessary to synchronize the shift register with the trailing edge and the control elements with the leading edge of the time pulses T. A second diagram in FIG. 3 shows the resetting pulse L on line L, which occurs only once for each scanning cycle. This pulse occurs after a record carrier has been read completely. The third diagram shows the state of the lines 50, 51 for the entry of data into the shift registers, while the last diagram E shows the state on line E coming from the outside, which brings about the reading out of data from the buffer storage. Above these two diagrams are indicated with the numbers 1 to 5 the five clock pulses coresponding to the five lines of the record carrier to be read successively. The reading out of the buffer storage need not necessarily follow immediately after the read in step. These timing signals are obtained from a suitable external source (not shown).

The arrangement described thus far is capable of analyzing a position criterion contained in the first line of each record carrier in such a way that the data flow enters the shift registers of the buffer storage in correct position. As has been mentioned, one or both rotations may occur.

Figure 4:
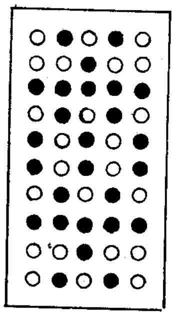
FIG. 4 is a rectangular record medium similar to that illustrated in FIG. 1 but having a space coded pattern of a symmetrical form to which translating apparatus in accordance with the invention is peculiarly adapted.
Figure 5:
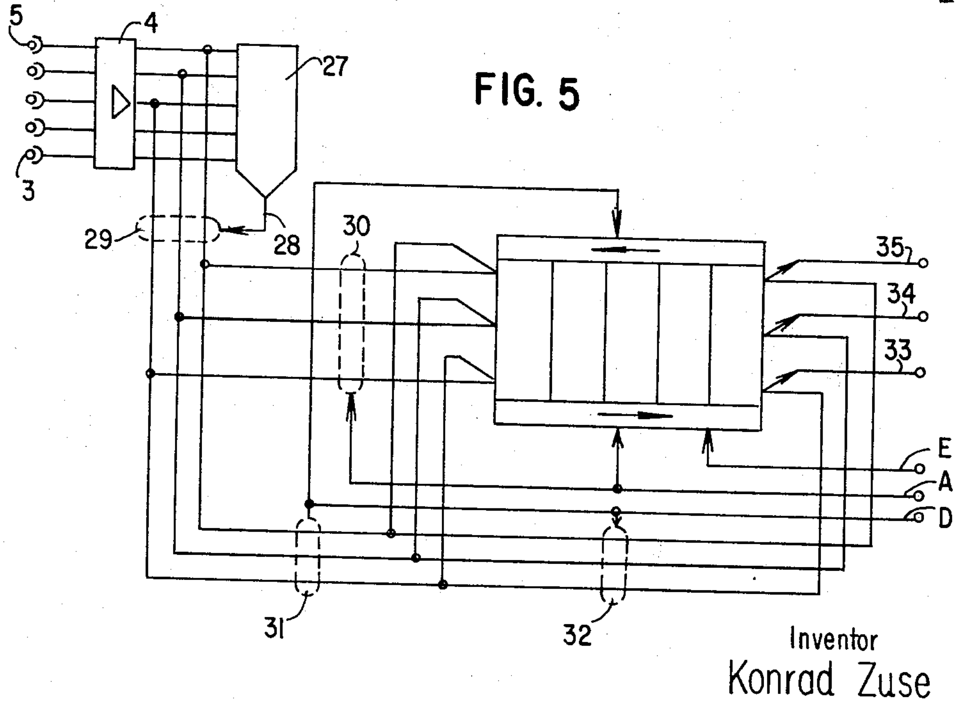

A second embodiment of the invention proceeds on the basis that a code is used for the coding of the data on the record carrier which is already insensitive to the rotations explained with reference to FIG. 1. FIGURE 4 shows a record carrier with ten columns and five rows. It is seen that the code pattern on the record carrier concerning "hole" and "no hole" arrangement is symmetrical to the axes explained with reference to FIG. 1*a*. For such a pattern, therefor, it does not matter whether the record carrier is moved past the scanning organs in a normal position or reversed due to the symmetry of the code along each axis of the record carrier. Of course, the selection of such a code means a reduction of the information density, as the code is very redundant. However, this disadvantage may become less important if it is desired to make an error test or even error correction during reading into the evaluating device. If the information pattern of the record carrier has only one axis of symmetry, then numerous reading errors can be recognized as symmetry errors; but if the record carrier has two axes of symmetry, as shown in FIG. 4, then an error correction can in many cases take place over and above the error recognition, since only those columns are transmitted in which no symmetry error was detected. Such a circuit arrangement is shown in FIGURE 5. Here also the outputs 3 of the reading devices are connected with a quintuple amplifier 4, whose five outputs are connected with a code testing circuit 27. This circuit can comprise, for example, a testing matrix or comparator known in the art, which furnishes a certain potential at its single output 28 only when there is no symmetry error in the line just read.

Figure 9:
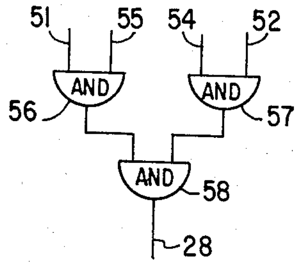
FIG. 9 is a typical comparator which could be used as the comparator 27 of FIG. 5.

Such arrangement (FIG. 9) could comprise a first AND gate energized by a coincidence of signals or no signals on lines 51 and 55 and a second AND gate 57 energized by a coincidence of signals or no signals on lines 52 and 54. A third AND gate 58, energized by a coincidence of the energization of the first and second AND gates 56, 57 would then provide a proper indication of symmetry by providing a signal on line 28. The AND gates 56 and 57 would be "half adders" as known in the art and provide an output signal whenever both inputs thereto are either "1" or "0," that is, pulse or no pulse. AND gate 58 will provide an output signal only when both inputs thereto are a "1," that is, both gates 56 and 57 are simultaneously enabled.

Figure 6:
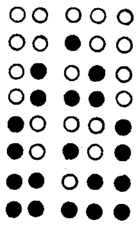
FIG. 6 illustrates still another record member having a space code of five transverse elements arranged in longitudinal rows of eleven elements for processing by apparatus in accordance with the invention.

FIGURE 6 shows all binary combinations of a line through whose central binary element an axis of symmetry extends. There are exactly 8 possibilities. From the first or last three binary elements of a line the information content of the whole line is completely evident already because of the symmetry property. In the arrangement according to FIG. 5, therefore, only three outputs of the quintuple amplifier 4 are utilized further. These three lines are supplied to a gate circuit 29, which is open only when the certain potential which indicates correctness of code prevails at the output 28 of the code testing circuit 27.

During the first half of a reading cycle of a record carrier, a gate circuit 30 following the gate circuit 29 is open and connects the three information lines to the shift registers of the buffer storage 5 constructed similarly to the buffer storage of FIG. 2, but arranged only for the absorption of three binary symbols per column.

The first half of the code on the record carrier gets into the shift register through the open gate circuits 29 and 30. Lines in which a code error has been found are, however, not transmitted, as the gate circuit 29 is blocked. During this first half of the reading cycle the shifting direction is from left to right which in the immediately following second half the shift registers are arranged for the reverse shifting direction. In this second half the gate circuit 30 remains closed, but instead two additional gate circuits 31 and 32 are open, through which the second half of the record carrier is fed into the shift registers from the right side. At the same time the shift registers are connected to form a ring, so that the information read in the first half cycle is preserved.

The reading out occurs as in the last described arrangement by a shift transport from left to right via output lines 33, 34, 35 under control of the externally energized line E. The two half cycles are identified by two control lines A and D which also come from the evaluating device and which are energized successively during the scanning of a record carrier.

The operation of this circuit arrangement is as follows: From each row scanned without symmetry error the information part thereof, from the first three code positions, is passed into the shift registers. A symmetry error interrupts the feeding but not the shifting. During the second feeding from the opposite direction, all cells of the shift registers into which a data row was read in without error are written over. In many cases, a symmetry error will not again occur during the second run at the same point as during the first run, so that in these cases the information essential for evaluation is complete for proper reading out from the registers.

The invention is not limited to the two examples explained in detail, but many modifications can be conceived, some of which have already been mentioned in the course of the description. In particular, of course, there are no restrictions whatsoever concerning the construction of the shift registers or of the gate circuits, the number of rows and colums, and the code used. Advantageously there can be constructed also combinations of the arrangements as per FIG. 2 and FIG. 5 with code patterns which have only one axis of symmetry but have possibilities of rotation about two axes. In such a case a detected symmetry error must immediately set off an alarm since error correction is not possible. However, the redundancy of the code is reduced.

It should further be understood that the shift registers of the buffer storage 5 could also be designed to read all signals thereinto from one end, the readout being from one or the other end thereof, depending upon the initial card orientation.

What is claimed is:

1. A translating apparatus for a space coded data reader for reading data disposed in rows and columns on a card, irrespective of the physical orientation of the card, each card having control data in the first and last column thereof to indicate a rotation of said card about a first and a second axis, said translating apparatus comprising:

a first control means for indicating a rotation of the card about the first axis of the card;

a second control means for indicating a rotation of the card about the second axis of the card;

a third control means coupled to said first and second control means;

a buffer storage unit where data from the cards is stored in a manner that said data can be read out in a sequence corresponding to that which would be obtained if the card were presented to the reader in correct physical orientation;

a plurality of paths interposed between said first, second, and third control means and said buffer storage unit by which the data from the card is transmitted into said buffer storage unit;

a gating circuit disposed in each of said plurality of paths for opening and closing said paths to said buffer storage unit; and means for applying a pulse to said buffer storage unit to initiate a readout of the information stored therein.

2. An apparatus as defined in claim 1 wherein said buffer storage unit has a first input, a second input and an output, and comprises a plurality of bi-directional shift registers.

3. An apparatus as defined in claim 1 wherein said first and second control means each comprise:

an AND gate having one input thereto for enabling said gate from said third control means; and a bistable control element having a set input coupled to an output of said AND gate, and a pair of outputs separately coupled to said gating circuit.

4. An apparatus as defined in claim 3 wherein said third control means comprises:

a bistable control element having a reset state responsive to the control data from the card.

5. An apparatus as defined in claim 4 further comprising:

means coupled to the inputs of all of said bistable control elements for changing the state thereof in response to a timed pulse.

6. An apparatus as defined in claim 5 wherein said buffer storage unit includes a first input, a second input and an output, and comprises a plurality of bi-directional shift registers.

7. A translating apparatus for a space coded reader having outputs for transmitting data signals to said apparatus, said data being disposed in rows and columns on a card, each card containing control data for indicating a rotation of said card about first and a second axis, said translating apparatus comprising:

a first control circuit responsive to the control data on the card for orientating the data which has been read from said card relative to the first axis;

a second control circuit responsive to the control data on the card for orientating the data which has been read from said card relative to the second axis;

a third control circuit having an output coupled to said first and second control circuit;

said first, second, and third control circuit coupled to the outputs of the reader;

a plurality of gates each coupled to be responsive to an output of one of said first, second and third control circuits;

a buffer storage unit having a first and a second input and an output, said buffer storage unit being coupled to said plurality of gates, said data from the card being transmitted from the outputs of the reader through at least one of said plurality of gates into said buffer storage unit; and means coupled to said storage unit to enable a readout from said buffer storage unit of the information stored therein in a sequence corresponding to that which would be obtained if the card were presented to the reader in a correct orientation.

8. Apparatus as defined in claim 7 wherein said buffer storage unit comprises a plurality of bi-directional shift registers in which the data from said card is stored.

9. An apparatus as defined in claim 8 further comprising:

means for connecting outputs of the reader to a first of said plurality of gates; and means for conecting the output of the reader to a second of said plurality of gates in a mirror reversal of said first of said plurality of gates said control data on the card determining which of said first and second of said plurality of gates is opened and the other closed.

10. An apparatus as defined in claim 9 further comprising:

means connecting the output of a third of said plurality of gates to the first input of said buffer storage unit; and means connecting the output of a fourth of said plurality of gates to the second input of said buffer storage unit.

11. An apparatus as defined in claim 10 further comprising:

means responsive to said second control circuit upon a rotation of the card about said second axis to provide reverse shifting of said bi-directional shift registers during data readin.

12. An apparatus as defined in claim 11 further comprising:

means responsive to said third control circuit in the absence of rotation of the card about said second axis to provide forward shifting of said bi-directional shift registers during data readin.

13. A translating apparatus for a space coded data reader having outputs for reading data in rows and columns symmetrical about a first and a second axis of a card, the reading of the card occurring over a first and second half cycle, said translating apparatus comprising:

a code testing circuit, coupled to the data reader outputs and responsive when all the data is symmetrical about the first axis;

a first gate opening and closing in response to signals from said code testing circuit;

a storage device for storing the data contained on said cards, said storage device having a first and a second input, and an output;

means connecting the data reader outputs with the input of said first gate;

means connecting the output of said first gate with said storage device; and means for applying a pulse to said storage unit to initiate a readout of the information stored therein.

14. An apparatus as defined in claim 13 further comprising:

a second gate coupled between the output of said first gate and the first input to said storage device;

a third gate coupled between the output of said first gate and the second input to said storage device;

said second gate being open for the first half-cycle and closed for the second half-cycle;

said third gate being closed for said first half-cycle and open for said second half-cycle;

energizing means to enable the opening and closing of said second and third gate; and control means opening said second gate and closing said third gate during the first half of a reading cycle of the cards and opening said third gate and closing said second gate during said second half of the reading cycle of said card.

15. An apparatus as defined in claim 14 wherein said storage device comprises:

a plurality of bi-directional shift registers for storing the data transmitted thereto during each half of the reading cycle, said shift registers being connected to form a ring to enable the information transmitted into the storage device during the first half-cycle to be preserved.

References Cited

UNITED STATES PATENTS

| | | | |
|---|---|---|---|
| 2,288,770 | 7/1942 | Armbruster | 235—61.11 X |
| 2,706,599 | 4/1955 | Smith | 235—61.11 |
| 3,026,029 | 3/1962 | Daniels | 235—61.12 |

DARYL W. COOK, *Primary Examiner.*